United States Patent
Lin et al.

(10) Patent No.: US 9,189,110 B2
(45) Date of Patent: Nov. 17, 2015

(54) SENSING AND DRIVING APPARATUS, TOUCH SENSING SYSTEM, AND SENSING AND DRIVING METHOD

(75) Inventors: Ching-Chun Lin, Taipei County (TW); Wing-Kai Tang, Hsinchu (TW); Ching-Ho Hung, Hsinchu (TW); Tsen-Wei Chang, Taichung County (TW); Yi-Liang Lin, Hsinchu County (TW); Jiun-Jie Tsai, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 699 days.

(21) Appl. No.: 13/037,364

(22) Filed: Mar. 1, 2011

(65) Prior Publication Data
US 2011/0210930 A1 Sep. 1, 2011

(30) Foreign Application Priority Data
Mar. 1, 2010 (TW) .................................. 99105807 A

(51) Int. Cl.
*G06F 3/041* (2006.01)
*G06F 3/044* (2006.01)

(52) U.S. Cl.
CPC .............. *G06F 3/044* (2013.01); *G06F 3/0416* (2013.01); *G06F 2203/04101* (2013.01)

(58) Field of Classification Search
USPC ........................................ 345/173; 178/18.01
See application file for complete search history.

(56) References Cited

U.S. PATENT DOCUMENTS

| | | | |
|---|---|---|---|
| 5,920,309 A | 7/1999 | Bisset et al. | |
| 6,597,347 B1 * | 7/2003 | Yasutake | 345/173 |
| 7,511,702 B2 * | 3/2009 | Hotelling | 345/173 |
| 7,932,898 B2 * | 4/2011 | Philipp et al. | 345/174 |
| 8,552,315 B2 * | 10/2013 | Yilmaz | 178/18.06 |
| 2007/0018078 A1 | 1/2007 | Miyazawa | |

FOREIGN PATENT DOCUMENTS

| | | |
|---|---|---|
| JP | 3116631 | 12/2000 |
| TW | 200802059 | 1/2008 |

OTHER PUBLICATIONS

"First Office Action of China Counterpart Application", issued on Oct. 19, 2012, p. 1-p. 7, in which the listed references were cited.
"Office Action of Taiwan Counterpart Application", issued on Oct. 29, 2013, p. 1-p. 6, in which the listed reference was cited.

* cited by examiner

*Primary Examiner* — Abbas Abdulselam
(74) *Attorney, Agent, or Firm* — Jianq Chyun IP Office

(57) ABSTRACT

A sensing and driving apparatus suitable for a sensing interface is provided. The sensing and driving apparatus includes a driving module and a sensing unit. The driving module outputs a first reference signal and a second reference signal which have different polarities with each other, and respectively transmits the first reference signal and the second reference signal to a first driving line and a second driving line of the sensing interface so as to generate a first sensing signal during a first period. The sensing unit receives the first sensing signal and detects a change of the first signal so as to generate a sensing result. A sensing and driving method, a touch sensing system and a device using the same are also provided herein.

19 Claims, 8 Drawing Sheets

SENSING AND DRIVING APPARATUS, TOUCH SENSING SYSTEM, AND SENSING AND DRIVING METHOD

CROSS-REFERENCE TO RELATED APPLICATION

This application claims the priority benefit of Taiwan application serial no. 99105807, filed on Mar. 1, 2010. The entirety of the above-mentioned patent application is hereby incorporated by reference herein and made a part of this specification.

BACKGROUND OF THE INVENTION

1. Field of the Invention

The invention relates to a driving apparatus, a driving method, and a touch sensing system. More particularly, the invention relates to a sensing and driving apparatus and a sensing and driving method used in a touch sensing system.

2. Description of Related Art

At present, the touch panels can be generally classified into resistive, capacitive, infrared, and ultrasonic touch panels, wherein the resistive touch panels and the capacitive touch panels are most common. Compared with the resistive touch panels which can only detect the operation of an user when the panel is pressed by the user, the capacitive touch panels can easily detect the operation of an user when the user's finger touches the panel or is suspended over the panel. In the conventional art, the capacitive touch panels detect a voltage change in sensing lines to obtain touch information of a single point or two points.

FIG. 1 illustrates a voltage waveform of a sensing line before and after the sensing line is touched. Before the sensing line is touched, the sensing circuit is required to store the voltage value V of the sensing line which serves as a baseline. Then, the actually measured voltage value V' is compared with the baseline so as to obtain a voltage change ΔV corresponding to the sensing line. As shown in FIG. 1, in addition to the voltage change ΔV of the sensing line, a common mode voltage also exists at the sensing side, which equals to voltage value V. Since an offset of an output voltage of the sensing circuit occurs due to the common mode voltage, the degree of sensitivity of the sensing circuit is reduced.

SUMMARY OF THE INVENTION

The invention is directed to a sensing and driving apparatus capable of reducing a common mode signal of a sensing signal, such that the degree of sensitivity of the sensing and driving apparatus is improved.

The invention is also directed to a touch sensing system which includes the above-mentioned sensing and driving apparatus and is capable of reducing a common mode signal of a sensing signal, such that the degree of sensitivity of the sensing and driving apparatus is improved.

The invention is also directed to a sensing and driving method capable of reducing a common mode signal of a sensing signal, such that the degree of sensitivity is improved.

The invention provides a sensing and driving apparatus suitable for a sensing interface. The sensing and driving apparatus includes a driving module and a sensing unit. The driving module outputs a first reference signal and a second reference signal which have different polarities with each other, and respectively transmits the first reference signal and the second reference signal to a first driving line and a second driving line of the sensing interface so as to accordingly generate a first sensing signal during a first period. The sensing unit receives the first sensing signal and detects a change of the first sensing signal so as to generate a sensing result accordingly.

In an embodiment of the invention, the driving module includes a driving unit and a multiplexing unit. The driving unit generates the first reference signal and the second reference signal which have different polarities with each other. The multiplexing unit receives the first reference signal and the second reference signal, and selectively transmits the first reference signal to the first driving line and the second reference signal to the second driving line.

In an embodiment of the invention, the first driving line receiving the first reference signal and the second driving line receiving the second reference signal are two adjacent driving lines of the sensing interface.

In an embodiment of the invention, the driving module further inverses the polarity of the second reference signal and transmits the inversed second reference signal to the second driving line during a second period. Besides, the driving module further outputs a third reference signal to a third driving line during the second period. The third driving line is another driving line adjacent to the second driving line, and a polarity of the third reference signal is opposite to the polarity of the second reference signal.

In an embodiment of the invention, the first reference signal and the second reference signal respectively include a plurality of pulses.

In an embodiment of the invention, the sensing interface has a plurality of first driving lines and a plurality of second driving lines. Moreover, the driving module further transmits the first reference signal to a first set of driving lines of the first driving lines and transmits the second reference signal to a second set of driving lines of the first driving lines according to the change of the first sensing signal so as to generate a second sensing signal during a second period. Besides, the sensing unit is suitable for detecting a change of the second sensing signal and generating the sensing result accordingly.

In an embodiment of the invention, the first reference signal and the second reference signal are square wave or sawtooth wave.

Furthermore, the invention also provides a touch sensing system which includes a sensing interface, the above-mentioned sensing and driving apparatus, and a processing unit. The sensing interface includes a first driving line and a second driving line, and the sensing and driving apparatus is coupled to the sensing interface. The processing unit determines a touch position of the sensing interface according to the sensing result.

In an embodiment of the invention, the processing unit further determines the touch position of the sensing interface according to the change of the second sensing signal.

Moreover, the invention also provides a sensing and driving method suitable for the above-mentioned sensing and driving apparatus.

Besides, the invention further provides a touch display apparatus and a portable electronic apparatus which include the above-mentioned touch sensing system.

Based on the above, in the embodiments of the invention, since the sensing and driving method used in the sensing and driving apparatus and the touch sensing system adapted for reducing a common mode signal of the sensing signal, the respective degrees of sensitivity of the sensing and driving apparatus and the touch sensing system are high.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 2:
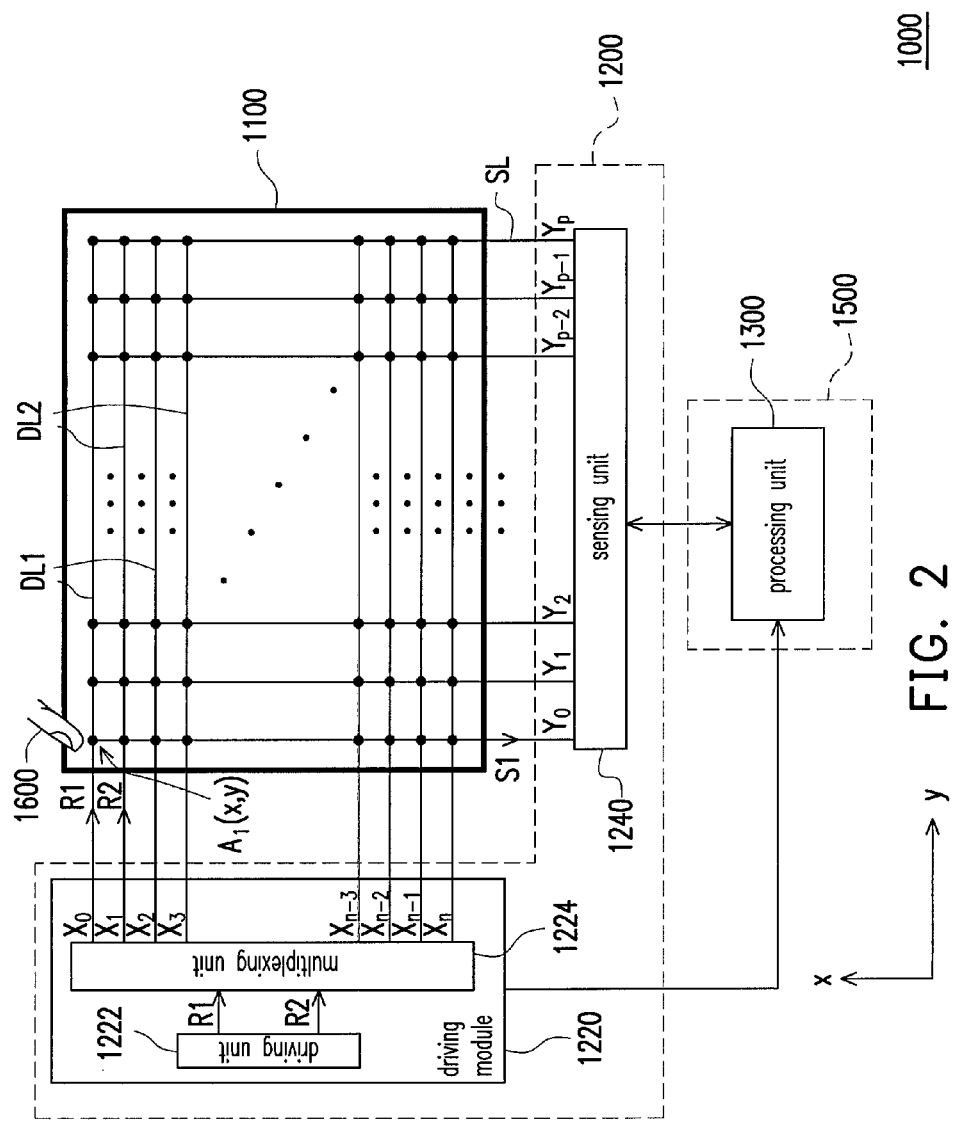
FIG. 2 is a touch sensing system according to an embodiment of the invention.

FIG. 2 is a touch sensing system 1000 according to an embodiment of the invention. Referring to FIG. 2, the touch sensing system 1000 includes a sensing interface 1100, a sensing and driving apparatus 1200, and a processing unit 1300. The sensing interface 1100 includes at least one driving line DL1 and at least one driving line DL2, and the driving line DL1 and driving line DL2 are two adjacent driving lines of the sensing interface 1100. Besides, the sensing interface 1100 also includes a plurality of sensing line SL. In the embodiment, the sensing interface 1100 is, for example, a touch panel of a touch display apparatus or another touch pad having a touch sensing function.

As shown in FIG. 2, the sensing and driving apparatus 1200 is coupled to the sensing interface 1100 and includes a driving module 1220 and a sensing unit 1240. The driving module is capable of simultaneously outputting a reference signal R1 and a reference signal R2, and respectively transmitting the reference signal R1 and the reference signal R2 to the driving line DL1 and the driving line DL2 so as to accordingly generate a sensing signal S1. Then, the sensing signal S1 is transmitted to the sensing unit 1240 via the sensing line SL. The sensing unit 1240 receives the sensing signal S1 and detects a change of the sensing signal S1 so as to generate a sensing result accordingly.

Moreover, the driving module of the embodiment includes, for example, a driving unit 1222 and a multiplexing unit 1224. The driving unit 1222 is used to simultaneously generates the reference signal R1 and the reference signal R2 which have different polarities with each other. Then, the multiplexing unit 1224 receives two reference signal R1 and reference signal R2. The multiplexing unit 1224 selectively transmits the reference signal R1 to at least one driving line DL1 of the sensing interface 1100 and selectively transmits the reference signal R2 to at least one driving line DL2 of the sensing interface 1100.

Figure 3:
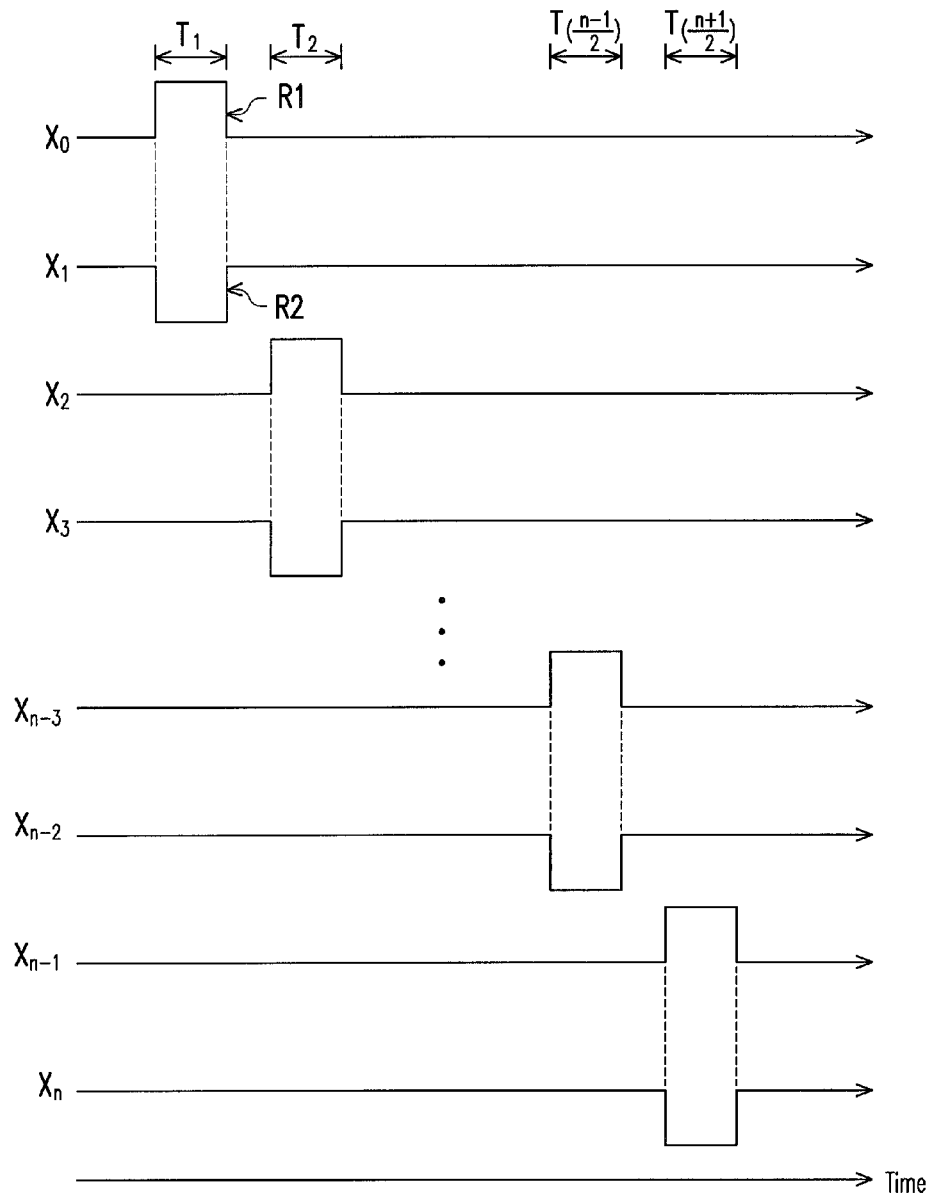
FIG. 3 is a timing diagram of reference signals output by a driving module.

FIG. 3 is a timing diagram of reference signals output by the driving module 1220, wherein reference numbers X0, X1, X2, X3 ... Xn−3, Xn−2, Xn−1, Xn correspond to positions of pins X0, X1, X2, X3 ... Xn−3, Xn−2, Xn−1, Xn of the driving module 1220 in FIG. 2, and n is a positive integer. Referring to both FIG. 2 and FIG. 3, in the embodiment, the driving module 1220 is capable of outputting the reference signal R1 and the reference signal R2 which have different polarities with each other (e.g. positive polarity and negative polarity) during a period T1, and respectively transmitting the reference signals R1 and R2 to the driving line DL1 corresponding to pin X0 and driving line DL2 corresponding to pin X1 so as to generate the sensing signal S1. The sensing signal S1 is transmitted to the sensing unit 1240 respectively from pin Y0 to pin Yp via the sensing lines SL. On the other hand, during the period T1, the other pins X2, X3, ... Xn−3, Xn−2, Xn−1, Xn are, for example, grounded. Besides, the reference signals R1 and R2 are, for example, square wave, sawtooth wave, or another driving wave.

Then, the sensing unit 1240 of FIG. 2 receives the sensing signal S1 and is capable of sensing a change of the sensing signal S1. In general, a change of the sensing signal S1 results from, for example, a touch object 1600 (e.g. a finger) touches or approaches to the sensing interface 1100. In the embodiment, the reference signals R1 and R2 are respectively positive polarity and negative polarity. However, the reference signals R1 and R2 may be respectively negative polarity and positive polarity in another embodiment, and the invention is not limited to the embodiment.

Figure 1:
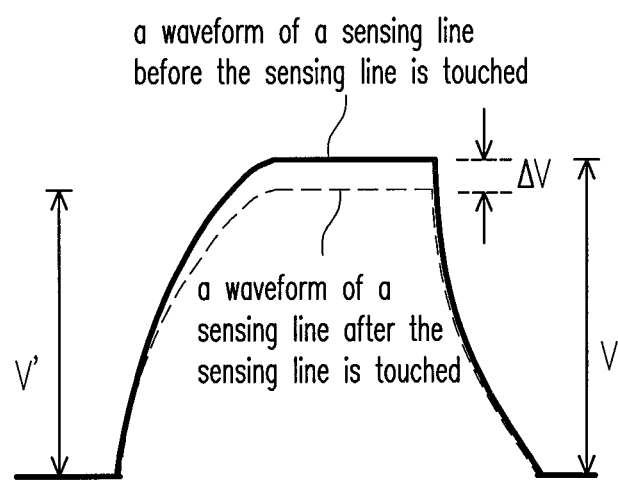
FIG. 1 illustrates a voltage waveform of a sensing line before and after the sensing line is touched.
Figure 4:
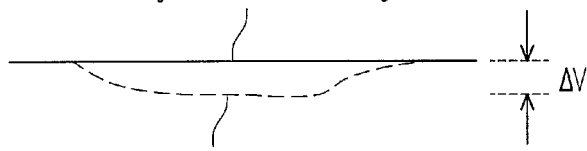
FIG. 4 illustrates a waveform of a sensing signal before and after a sensing line is touched.

FIG. 4 illustrates a waveform of a sensing signal before and after being changed. Referring to FIG. 4, since the driving module 1220 simultaneously outputs the reference signals R1 and R2 having opposite polarities with each other to the driving line DL1 and driving line DL2, no common voltage exists (as shown in FIG. 1) in the sensing signal S1 generated by the sensing and driving apparatus 1200. In other words, by the counteraction between the positive polarity of the reference signal R1 and the negative polarity of the reference signal R2, a common mode signal in the sensing signal S1, before the sensing signal S1 is changed, is significantly reduced and substantially equal to zero. On the other hand, when the touch object 1600 approaches to or touches the sensing interface 1100, a change ΔV occurs in the sensing signal S1, which is caused by, for example, the charge sharing among coupled capacitors. Then, the sensing unit 1240 detects the change of the sensing signal S1. Therefore, the processing unit 1300 is capable of determining a position coordinates A1(x, y) of the touch object 1600. In the embodiment, the processing unit 1300 is, for example, embedded in a carrying unit 1500, and the carrying unit 1500 are, for example, a computer system or any electronic product having a processing unit. From another perspective, the above-mentioned electronic product is, for example, a touch display or a portable electronic apparatus including the touch sensing system 1000.

Similarly, during a period T2, the driving module 1220 also simultaneously outputs the reference signal R1 and the reference signal R2 which have different polarities with each other (e.g. positive polarity and negative polarity), and respectively transmits the reference signal R1 and R2 to the next two adjacent driving line DL1 and driving line DL2 so as to generate the sensing signal S1 in another sensing line SL. In the embodiment, a common signal of the sensing signal S1 is almost to zero, and the driving line DL1 and driving line DL2 are, for example, corresponding to pin X2 and X3. Descriptions about the sensing signal S1 have already been described elsewhere, a detailed description is omitted hereinafter.

Moreover, during the period T2, the other pins X0, X1, X4, X5, ... Xn−3, Xn−2, Xn−1, Xn are, for example, grounded.

On the other hand, since driving waveforms corresponding to pins Xn−3 and Xn−2 of the driving module 1220 during a period T(n−1)/2 and driving waveforms corresponding to pins Xn−1 and Xn of the driving module 1220 during a period T(n+1)/2 are similar to the driving waveforms of pins X0 and X1 during the period T1, further descriptions are omitted hereinafter. As a whole, the driving module 1220 of the embodiment respectively outputs two reference signals having opposite polarities with each other to two adjacent driving lines (e.g. the driving lines DL1 and DL2 of FIG. 2) during each period, so that a common signal in the sensing signal S1 is reduced and the degree of sensitivity of the touch sensing system 1000 is further enhanced.

Figure 5:
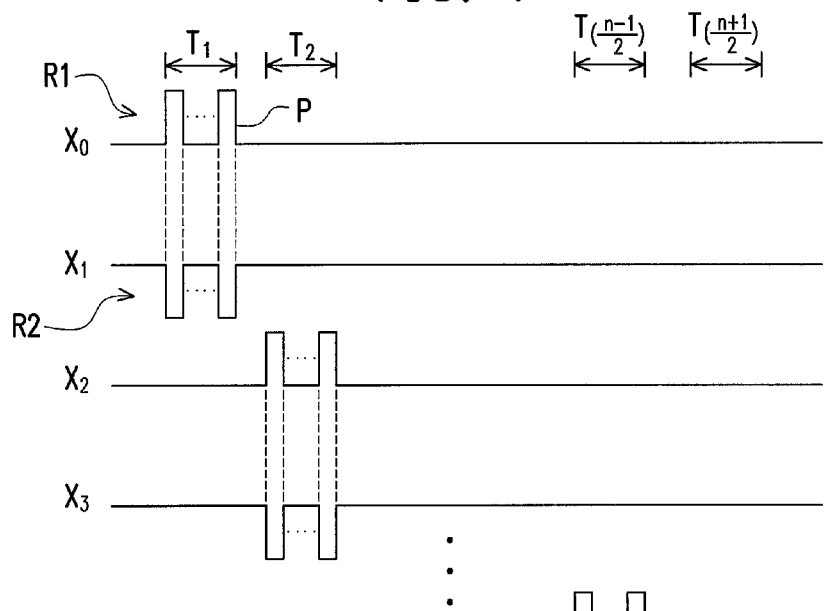
FIG. 5 is a timing diagram of reference signals output by a driving module according to another embodiment of the invention.

FIG. 5 is a timing diagram of reference signals output by a driving module according to another embodiment of the invention. FIG. 5 is similar to FIG. 3, wherein the driving module 1220 also outputs two reference signals R1 and R2 having opposite polarities with each other (e.g. positive polarity and negative polarity) to the driving lines DL1 and DL2 corresponding to different pins. However, the main difference between FIG. 3 and FIG. 5 is that the reference signals R1 and R2 respectively includes a plurality of pulses P. The pulses P are, for example, generated by repeatedly turning on or turning off the multiplexing unit 1224. On the other hand, since the pulses P of the reference signals R1 and the pulses P of the reference signal R2 have opposite polarities with each other, the sensing and driving apparatus 1200 is also capable of generating the sensing signal S1 with a common signal substantially equal to zero. Thus, the degree of sensitivity of the touch sensing system 1000 is improved. Other relevant illustrations can be referred to the foregoing and is not omitted hereinafter.

Figure 6:
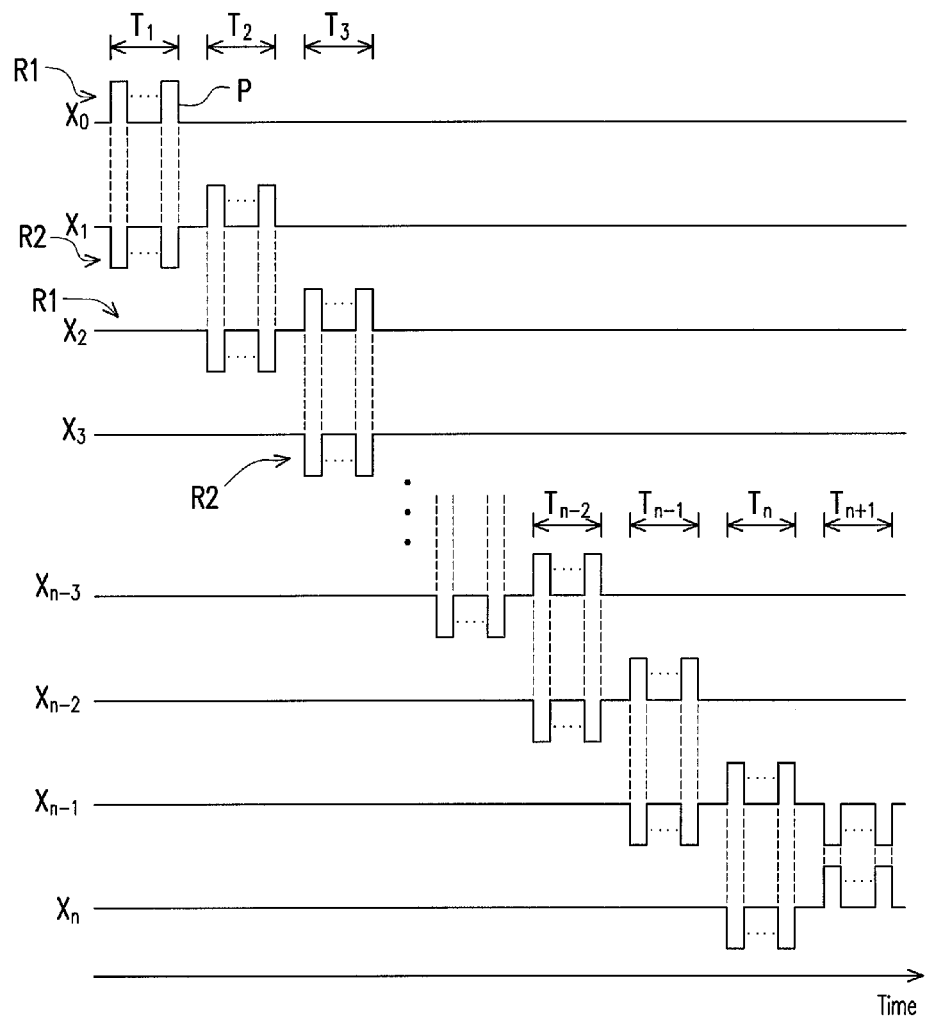
FIG. 6 is a timing diagram of reference signals output by a driving module according to another embodiment of the invention.

FIG. 6 is a timing diagram of reference signals output by a driving module according to another embodiment of the invention. As shown in FIG. 6, the driving module 1220 also outputs two reference signals R1 and R2 having opposite polarities with each other (e.g. positive polarity and negative polarity) to two adjacent driving line, and the reference signals R1 and R2 respectively includes a plurality of pulses P, which is similar to FIG. 5. Specifically, during the period T1, the reference signals R1 and R2 are, for example, respectively transmitted to the driving line DL1 corresponding to pin X0 and the driving line DL2 corresponding to pin X1, so that the sensing signal S1 is generated in the sensing line SL.

Besides, referring to both FIG. 2 and FIG. 6, the driving module 1220 applying the driving timing of FIG. 6 further continuously outputs the reference signal R2 to the driving line DL2 corresponding to pin X1 during the period T2, and the polarity of the reference signal R2 during the period T2 is opposite to the polarity of the reference signal R2 during the period T1. Simultaneously, the driving module 1220 also outputs the reference signal R1 to another driving line DL1 adjacent to the driving line DL2, wherein the driving line DL1 is, for example, corresponding to pin X2. Similarly, the polarity of the reference signal R1 during the period T2 is opposite to the polarity of the reference signal R2 during the period T2, so that another sensing signal S1 with a common signal substantially equal to zero is generated during period T2.

Then, during the period T3, the driving module 1220 continuously outputs the reference signal R1 to the driving line DL1 corresponding to pin X2, and the polarity of the reference signal R1 during the period T3 is opposite to the polarity of the reference signal R1 during the period T2. Simultaneously, the driving module 1220 also outputs the reference signal R2 to another driving line DL2 corresponding to pin X3 which is another driving line adjacent to the driving line DL1 corresponding to pin X2. Similarly, the polarity of the reference signal R2 during the period T3 is opposite to the polarity of the reference signal R1 during the period T3, so that another sensing signal S1 with a common signal substantially equal to zero is generated during period T3.

Driving timing of other periods, e.g. periods Tn−2 to Tn, are similar to the driving timing of the periods T1 to T3. People having ordinary skill in the art can infer the operation of driving module 1220 during other periods based on the teachings of the above description, and thus relevant description is not repeated hereinafter. Besides, in order to make the reference signal corresponding to pin Xn have an corresponding reference signal which has an polarity opposite to the polarity of the reference signal corresponding to pin Xn so as to generate the sensing signal S1 with minimum common signal, the driving module 1220 further continuously outputs the reference signal to the driving line corresponding to pin Xn−1. As shown in FIG. 6, the polarity of the above reference signal during the period Tn+1 is opposite to the polarity of the reference signal during the period Tn and is the same as the polarity of the reference signal during the period Tn−1. That is to say, when the driving module 1220 applies the driving timing of FIG. 6, a majority of driving lines of the sensing interface 1110 each receives the reference signal with different polarities during two successive periods.

Figure 7:
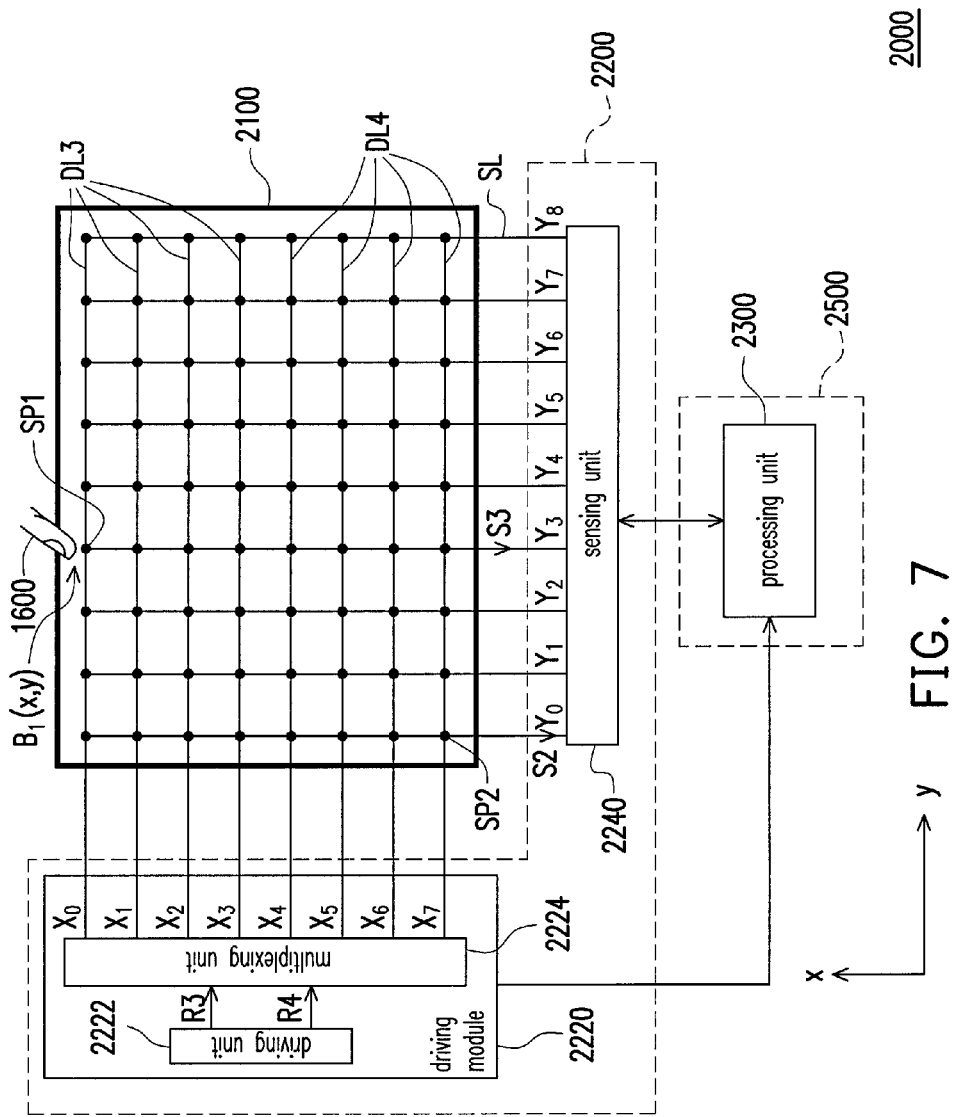
FIG. 7 is a touch sensing system according to another embodiment of the invention.

FIG. 7 is a touch sensing system 2000 according to another embodiment of the invention. Referring to FIG. 7, the touch sensing system 2000 includes a sensing interface 2100, a sensing and driving apparatus 2200, and a processing unit 2300. The sensing interface 2100 includes at least one driving line DL3 and at least one driving line DL4. The number of the driving lines DL3 and the number of the driving lines DL4 are, for example, respectively 2M, wherein M is a positive integer and M=2 in the embodiment. Besides, the sensing interface 2100 also includes a plurality of sensing line SL. In the embodiment, the sensing interface 2100 is, for example, a touch panel of a touch display apparatus or another touch pad having a touch sensing function.

As shown in FIG. 7, the sensing and driving apparatus 2200 is coupled to the sensing interface 2100 and includes a driving module 2220 and a sensing unit 2240. The driving module 2220 is capable of simultaneously outputting a reference signal R3 and a reference signal R4 (e.g. positive polarity and negative polarity), and respectively transmitting the reference signal R3 and the reference signal R4 to the driving line DL3 and the driving line DL4 so as to accordingly generate a sensing signal S2 at the sensing line SL side. The sensing unit 2240 receives the sensing signal S2 and detects a change of the sensing signal S2 so as to generate a sensing result accordingly. The sensing result is used to determine a touch position of a touch object, for example.

Moreover, the driving module 2220 of the embodiment includes, for example, a driving unit 2222 and a multiplexing unit 2224. The driving unit 2222 is used to simultaneously generate the reference signal R3 and the reference signal R4 which have different polarities with each other. Then, the multiplexing unit 2224 receives two reference signals R3 and R4, and selectively transmits the reference signal R3 to at least one driving line DL3 and the reference signal R4 to at least one driving line DL4.

Figure 8:
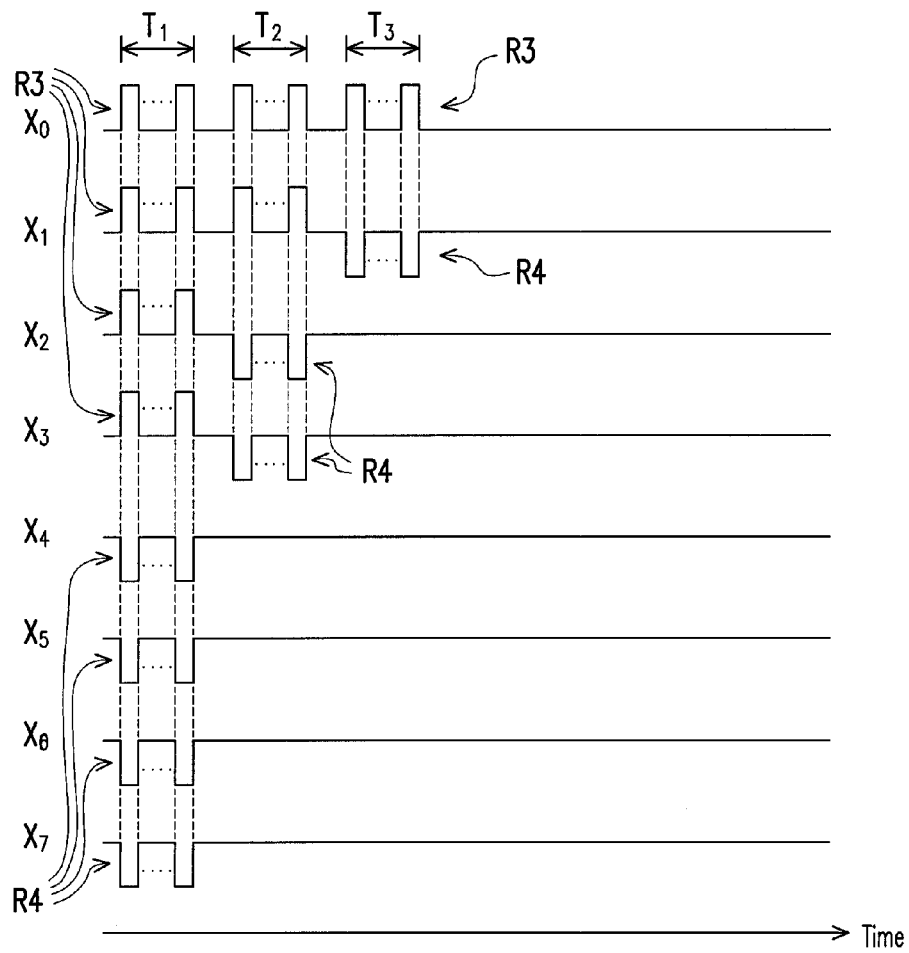
FIG. 8 is a timing diagram of reference signals output by a driving module.

FIG. 8 is a timing diagram of reference signals output by the driving module 2220, wherein reference numbers X0 to X7 respectively correspond to positions of pins X0 to X7 of the driving module 2220 in FIG. 7. Referring to both FIG. 7 and FIG. 8, in the embodiment, the driving module 2220 is capable of outputting the reference signal R3 and the reference signal R4 which have different polarities with each other (e.g. positive polarity and negative polarity), and transmitting the reference signals R3 and R4 respectively to the driving lines DL3 corresponding to pins X0 to X3 and the driving lines DL4 corresponding to pins X4 to X7 so as to generate the sensing signal S3. The sensing signal S3 is transmitted to the sensing unit 1240 respectively from pin Y0 to pin Yp, for example. Besides, the reference signals R3 and R4 of the embodiment are, for example, square wave, sawtooth wave, or another driving wave. In addition, the reference signals R3 and R4 are, for example, include a plurality of pulses P.

Then, the sensing unit 2240 of FIG. 7 receives the sensing signal S3 and is capable of sensing a change of the sensing signal S3. In general, a change of the sensing signal S3 results from, for example, a touch object 1600 (e.g. a finger) touches or approaches to the sensing interface 2100. In the embodiment, the reference signals R3 and R4 are respectively positive polarity and negative polarity. However, the reference signals R3 and R4 may be respectively negative polarity and positive polarity in another embodiment, and the invention is not limited to the embodiment.

Referring to FIG. 8, since the driving module 2220 simultaneously outputs the reference signals R3 and R4 having opposite polarities with each other to the driving lines DL3 and the driving lines DL4, no common voltage exists (as shown in FIG. 1) in the sensing signal S2 generated by the sensing and driving apparatus 3200. In other words, the embodiment is similar to the above-mentioned embodiment. By the counteraction between the positive polarity of the reference signal R3 and the negative polarity of the reference signal R4, a common mode signal in the sensing signal S2 before the sensing signal is changed is significantly reduced and substantially equal to zero. When the touch object 1600 approaches to or touches the sensing interface 2100, a change of the sensing signal S2 corresponding to a touch position (e.g. a position SP1) occurs, which is caused by, for example, the charge sharing among coupled capacitors.

On the other hand, since the driving lines DL3 and driving line DL4 receive reference signals R3 and R4 having different polarities with each other, a change of the sensing signal S2 (e.g. an increase or a decrease in the sensing signal), varies according to whether the touch object 1600 touches a position corresponding to the driving line DL3 or touches a position corresponding to the driving line DL4. Specifically, when a touch position of the touch object 1600 is the position SP1 (corresponding to pin X0 of the driving line DL3) during the period T1, the magnitude of the sensing signal S2 is, for example, slightly decreased. In the meantime, the sensing unit 2240 detects a change of the sensing signal S2 of the sensing line SL corresponding to pin Y3, such that the processing unit 2300 is capable of determining the coordinate y of the touch position. On the other hand, in another embodiment, when a touch position of the touch object 1600 is the position SP2 (corresponding to pin X7 of the driving line DL4) during the period T1, the magnitude of the sensing signal S2 is, for example, slightly increased. In the meantime, the sensing unit 2240 detects a change of the sensing signal S2 of the sensing line SL corresponding to pin Y0, such that the processing unit 2300 is capable of determining the coordinate y of the touch position. In the embodiment, the processing unit 2300 is, for example, embedded in a carrying unit 2500, and the carrying unit 2500 are, for example, a computer system or any electronic product having a processing unit.

Referring to FIG. 7 and FIG. 8, once the touch object 1600 touches the position SP1 during the period T1 which results in a change of the sensing signal S2 of the sensing line SL corresponding to pin Y3 (e.g. the magnitude of the sensing signal S2 is slightly decreased), the driving module 2220 is able to transmit the reference signal R3 to the 1st to 2nd driving lines of the four driving lines DL3 (i.e. the 1st set of driving lines of the driving lines DL3) during the period T2 according to the change of the sensing signal S2. Herein, the 1st and the 2nd driving lines are the driving lines DL3 respectively corresponding to pins X0 and X1. Simultaneously, the driving module 2220 also transmits the reference signal R4 to the 3rd to 4th driving lines of the driving lines DL3 (i.e. the 2nd set of driving lines of the driving lines DL3) so as to generates a sensing signal S3. For example, a multiplexing unit 2224 of the driving module 2220 selectively transmits the reference signal R3 to the 1st to 2nd driving lines of the four driving lines DL2, and selectively transmits the reference signal R4 to the 3rd to 4th driving lines of the four driving lines DL3. Then, the sensing unit 2240 detects a change of the sensing signal S3 corresponding to pin Y3 again, e.g. the magnitude of the sensing signal S3 is slightly decrease.

Similarly, the driving module 2220 further transmits the reference signal R3 (e.g. positive polarity) to the 1st driving line DL3 corresponding to pin X0 during the period T3, and transmits the reference signal R4 (e.g. negative polarity) to the 2nd driving line DL3 corresponding to pin X1 during the period T3. Then, the sensing unit 2240 detects a change of the sensing signal S3 corresponding to pin Y3 again, e.g. the magnitude of the sensing signal S3 is slightly decrease. Thus, the processing unit 2300 is capable of determining the touch position of the touch object is corresponding to the driving line DL3 corresponding to pin X0, and further capable of determining the position coordinates of the touch position SP1 is B1$(x, y)$. In other words, the touch sensing system 2000 of the embodiment mainly uses a method similar to a binary search to determine the touch position of the touch object 1600. In particular, the touch sensing system 2000 limits the touch range gradually according to a change of the sensing signal, e.g. an increase or a decrease in the sensing signal.

Figure 9:
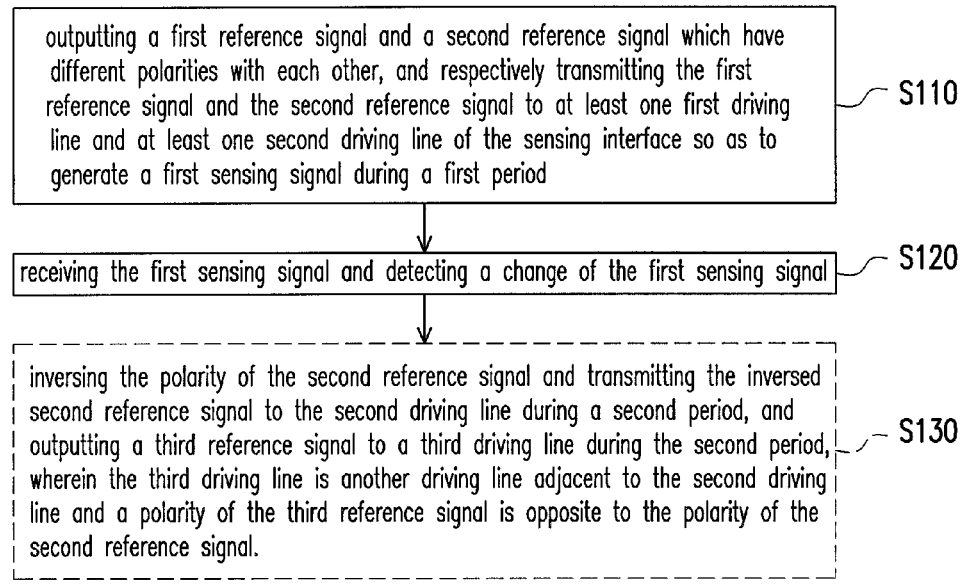
FIG. 9 is a flow chart illustrating a sensing and driving method according to another embodiment of the invention.

FIG. 9 is a flow chart illustrating a sensing and driving method according to another embodiment of the invention. The sensing and driving method is suitable for a sensing interface, and the sensing interface includes at least one first driving line and at least one second driving lines. Specifically, the sensing interface is, for example, the sensing interface 1100 of FIG. 2 or the sensing interface 2100 of FIG. 7, and the first driving line and the second driving line are, for example, the driving line DL1 or DL3 and the driving line DL2 or DL4.

Referring to FIG. 9, the sensing and driving method of the embodiment includes the following steps. First, as shown in step S110, a first reference signal (e.g. the reference signal R1 or R3) and a second reference signal (e.g. the reference signal R2 or R4) which have different polarities with each other is output, and the first reference signal and the second reference signal are respectively transmitted to the above-mentioned at least one first driving line and the at least one second driving line so as to generate a first sensing signal (e.g. the sensing signal S1 or S2) during a first period (e.g. the period T1). Then, step S120 is performed. The first sensing signal is received and a change of the first sensing signal is detected.

Besides, in another embodiment, the sensing and driving method further includes step S130. That is, the polarity of the second reference signal (e.g. the reference signal S2) is inversed and the inversed second reference signal is transmitted to the second driving line (e.g. the driving line DL2 corresponding to pin X2) during a second period (e.g. the period T2), and a third reference signal (e.g. the reference signal R1) is output to a third driving line (e.g. the driving line DL1 corresponding to pin X2), wherein the third driving line is another driving line adjacent to the second driving line during the second period and a polarity of the third reference signal is opposite to the polarity of the second reference signal (step S130).

Figure 10:
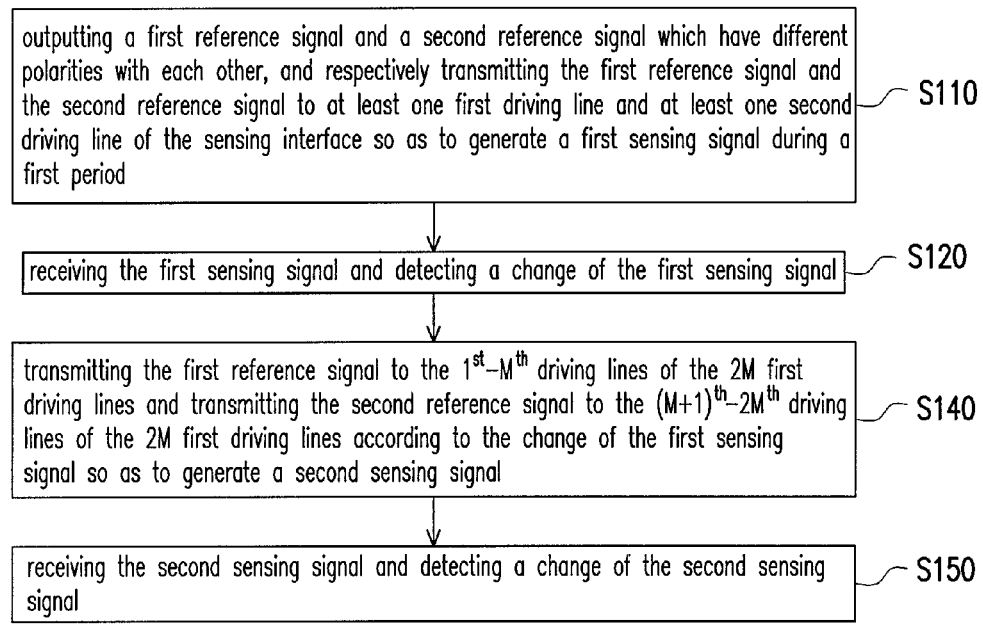
FIG. 10 is a flow chart illustrating a sensing and driving method according to another embodiment of the invention.

FIG. 10 is a flow chart illustrating a sensing and driving method according to another embodiment of the invention. In the embodiment, the sensing and driving method not only includes steps S110 and S120, but also includes steps S140 and S150. In the embodiment, the number of the at least one first driving line (e.g. the driving line DL3) in step S110 is 2M, and the number of the at least one second driving line (e.g. the driving line DL4) in step S110 is 2M, wherein M is a positive integer. In step S140, the first reference signal (e.g. the reference signal S3) is transmitted to the 1st to Mth driving lines of the 2M first driving lines (e.g. the driving lines DL3), and the second reference signal (e.g. the reference signal S4) is transmitted to the (M+1)th to 2Mth driving lines of the 2M first driving lines according to the change of the first sensing signal (e.g. the first reference signal S2) so as to generate a second sensing signal (e.g. the sensing signal S3). Then, the second sensing signal (e.g. the sensing signal S3) is received and a change of the second sensing signal is detected (step S150).

In summary, in the embodiment, since the driving module simultaneously outputs reference signals with different polarities to at least two driving lines, a common mode signal of the sensing signal is reduced to substantially equal to zero by the counteraction between the positive polarity and the negative polarity. Thus, the sensing and driving apparatus is capable of sensing a change of the sensing signal accurately, and the degree of the sensitivity related to a touch occurrence of the touch sensing system is further enhanced.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A sensing and driving apparatus suitable for a sensing interface, the sensing and driving apparatus comprising:
   a driving module, outputting a first reference signal and a second reference signal which have different polarities with each other, and respectively transmitting the first reference signal and the second reference signal to a first driving line and a second driving line of the sensing interface so as to accordingly generate a first sensing signal during a first period, wherein the first driving line and the second driving line are extended along the same direction of the sensing interface; and
   a sensing unit, receiving the first sensing signal and detecting a change of the first sensing signal so as to generate a sensing result accordingly,
   wherein the first driving line receiving the first reference signal and the second driving line receiving the second reference signal are two adjacent driving lines of the sensing interface extended along the same direction of the sensing interface.

2. The sensing and driving apparatus as claimed in claim 1, wherein the driving module comprising:
   a driving unit, generating the first reference signal and the second reference signal which have different polarities with each other; and
   a multiplexing unit, receiving the first reference signal and the second reference signal, and selectively transmitting the first reference signal to the first driving line and the second reference signal to the second driving line.

3. The sensing and driving apparatus as claimed in claim 1, wherein the driving module further inverses the polarity of the second reference signal and transmits the inversed second reference signal to the second driving line during a second period, and outputs a third reference signal to a third driving line during the second period, wherein the third driving line is another driving line adjacent to the second driving line, and a polarity of the third reference signal is opposite to the polarity of the second reference signal.

4. The sensing and driving apparatus as claimed in claim 1, wherein the first reference signal and the second reference signal respectively comprise a plurality of pulses.

5. The sensing and driving apparatus as claimed in claim 1, wherein the sensing interface has a plurality of first driving lines and a plurality of second driving lines, and the driving module further transmits the first reference signal to a first set of driving lines of the first driving lines and transmits the second reference signal to a second set of driving lines of the first driving lines according to the change of the first sensing signal so as to generate a second sensing signal during a second period, and the sensing unit is suitable for detecting a change of the second sensing signal and generating the sensing result accordingly.

6. The sensing and driving apparatus as claimed in claim 1, wherein the first reference signal and the second reference signal are square wave or sawtooth wave.

7. A touch sensing system, comprising:
   a sensing interface, comprising a first driving line and a second driving line which are extended along the same direction of the sensing interface;
   a sensing and driving apparatus, coupled to the sensing interface and comprising:
   a driving module, outputting a first reference signal and a second reference signal which have different polarities with each other, and respectively transmitting the first reference signal and the second reference signal to a first driving line and a second driving line so as to accordingly generate a first sensing signal during a first period; and
   a sensing unit, receiving the first sensing signal and detecting a change of the first sensing signal so as to generate a sensing result accordingly; and
   a processing unit, determining a touch position of the sensing interface according to the sensing result,
   wherein the first driving line receiving the first reference signal and the second driving line receiving the second reference signal are two adjacent driving lines of the sensing interface extended along the same direction of the sensing interface.

8. The touch sensing system as claimed in claim 7, wherein the driving module comprising:
   a driving unit, generating the first reference signal and the second reference signal which have different polarities with each other; and
   a multiplexing unit, receiving the first reference signal and the second reference signal, and selectively transmitting the first reference signal to the first driving line and the second reference signal to the second driving line.

9. The touch sensing system as claimed in claim 7, wherein the driving module further inverses the polarity of the second reference signal and transmits the inversed second reference signal to the second driving line during a second period, and outputs a third reference signal to a third driving line during the second period, wherein the third driving line is another driving line adjacent to the second driving line, and a polarity of the third reference signal is opposite to the polarity of the second reference signal.

10. The touch sensing system as claimed in claim 7, wherein the first reference signal and the second reference signal respectively comprise a plurality of pulses.

11. The touch sensing system as claimed in claim 7, wherein the sensing interface has a plurality of first driving lines and a plurality of second driving lines, and the driving module further transmits the first reference signal to a first set of driving lines of the first driving lines and transmits the second reference signal to a second set of driving lines of the first driving lines according to the change of the first sensing signal so as to generate a second sensing signal during a second period, and the sensing unit is suitable for detecting a change of the second sensing signal and generating the sensing result accordingly.

12. The touch sensing system as claimed in claim 11, wherein the processing unit further determining the touch position of the sensing interface according to the change of the second sensing signal.

13. The touch sensing system as claimed in claim 7, wherein the first reference signal and the second reference signal are square wave or sawtooth wave.

14. A touch display apparatus comprising the touch sensing system as claimed in claim 7.

15. A portable electronic apparatus comprising the touch sensing system as claimed in claim 7.

16. A sensing and driving method suitable for a sensing interface, the sensing and driving method comprising:
    outputting a first reference signal and a second reference signal which have different polarities with each other, and respectively transmitting the first reference signal and the second reference signal to a first driving line and a second driving line extended along the same direction of the sensing interface so as to accordingly generate a first sensing signal during a first period; and
    receiving the first sensing signal and detecting a change of the first sensing signal so as to generate a sensing result accordingly,
    wherein the first driving line receiving the first reference signal and the second driving line receiving the second reference signal are two adjacent driving lines of the sensing interface extended along the same direction of the sensing interface.

17. The sensing and driving method as claimed in claim 16, further comprising:
    inversing the polarity of the second reference signal and transmitting the inversed second reference signal to the second driving line during a second period; and
    outputting a third reference signal to a third driving line during the second period,
    wherein the third driving line is another driving line adjacent to the second driving line, and a polarity of the third reference signal is opposite to the polarity of the second reference signal.

18. The sensing and driving method as claimed in claim 16, wherein the first reference signal and the second reference signal respectively comprise a plurality of pulses.

19. The sensing and driving method as claimed in claim 16, further comprising:
    transmitting the first reference signal to a first set of driving lines of the first driving lines and the second reference signal to a second set of driving lines of the first driving lines according to the change of the first sensing signal so as to generate a second sensing signal during a second period; and
    receiving the second sensing signal and detecting a change of the second sensing signal so as to generate the sensing result accordingly.

* * * * *